US006738885B1

(12) United States Patent
Zhang et al.

(10) Patent No.: US 6,738,885 B1
(45) Date of Patent: May 18, 2004

(54) DEVICE AND METHOD FOR STORING INFORMATION IN MEMORY

(75) Inventors: David X. Zhang, San Jose, CA (US); Kenneth C. Yeager, Sunnyvale, CA (US); Steven T. Peltier, Mountain View, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 151 days.

(21) Appl. No.: 09/788,175

(22) Filed: Feb. 15, 2001

(51) Int. Cl.[7] .............................................. G06F 12/00
(52) U.S. Cl. ........................... 711/173; 714/37; 714/45
(58) Field of Search .................................. 711/156, 161, 711/170, 173; 702/187; 714/15, 27, 32, 37, 45

(56) References Cited

U.S. PATENT DOCUMENTS

| 5,027,297 A | * | 6/1991 | Garitty et al. ............. 340/3.22 |
| 5,226,153 A | * | 7/1993 | DeAngelis et al. ........... 714/12 |
| 6,145,123 A | * | 11/2000 | Torrey et al. ............... 717/128 |
| 6,148,381 A | * | 11/2000 | Jotwani ...................... 150/151 |
| 6,202,127 B1 | * | 3/2001 | Dean et al. ................... 711/118 |
| 6,345,295 B1 | * | 2/2002 | Beardsley et al. ........... 709/224 |

* cited by examiner

Primary Examiner—Matthew M. Kim
Assistant Examiner—Woo H. Choi
(74) Attorney, Agent, or Firm—Baker Botts L.L.P.

(57) ABSTRACT

An information capturing device (10) includes a controller (12) and a memory (14). The controller (12) partitions a memory space of the memory (14) into a plurality of memory blocks (20). The controller (12) controls the storage of received information into a first set (22) of the plurality of memory blocks (20). The controller (12) continues to store received information only in the first set (22) of the plurality of memory blocks (20) through reuse and recycle until a first triggering event occurs. In response to the first triggering event, the controller (12) halts the storage of received information in the first set (22) of the plurality of memory blocks (20) and begins storing received information in a second set (24) of the plurality of memory blocks (20). When the second set (24) of the plurality of memory blocks (24) has reached its storage capacity, the controller (12) begins storing received information in a third set (26) of the plurality of memory blocks (20). The controller (12) continues to store received information only in the third set (26) of the plurality of memory blocks (20) through reuse and recycle until a second triggering event occurs. Information pertaining to the first triggering event is maintained in the first set (22) and the second set (24) of the plurality of memory blocks (20).

20 Claims, 2 Drawing Sheets

DEVICE AND METHOD FOR STORING INFORMATION IN MEMORY

TECHNICAL FIELD OF THE INVENTION

The present invention relates in general to processor debugging and analysis techniques and more particularly to a device and method for storing information in memory.

BACKGROUND OF THE INVENTION

In determining the cause of an error or failure during instruction execution by a processor, it is desirable to capture the state of the processor around the time the failure occurred. Conventional techniques for fault analysis include capturing information when triggered by the failure. However, this technique does not provide any information prior to the failure which is usually more helpful in analyzing the failure than the post failure data. Other techniques cannot effectively capture failure data when more than one failure occurs. Further, an out of order sequencing implementation may destroy the natural address order for captured information. This makes it difficult to recover the information pertaining to a failure. Therefore, it is desirable to have a technique that handles multiple failure occurrences while implementing an out of order sequence in memory.

SUMMARY OF THE INVENTION

From the foregoing, it may be appreciated by those skilled in the art that a need has arisen for a technique to capture information surrounding a triggering event. In accordance with the present invention, a device and method for storing information in a memory are provided that substantially eliminate or greatly reduce disadvantages and problems associated with conventional analysis techniques.

According to an embodiment of the present invention, there is provided a method for storing data in a memory that includes partitioning a memory space into a plurality of memory blocks. Received information is stored in a first set of the plurality of memory blocks. In response to a first triggering event, storing of received information in the first set of the plurality of memory blocks is halted. Received information is then stored in a second set of the plurality of memory blocks in response to the first triggering event. In this manner, information associated with a triggering event can be captured just prior to and just subsequent to the triggering event in order to analyze the cause and determine a solution for the triggering event.

The present invention provides various technical advantages over conventional analysis data gathering operations. For example, one technical advantage is to effectively capture prior and subsequent information associated with a triggering event. Another technical advantage is to effectively utilize and manipulate a limited memory space in capturing selected information. Yet another technical advantage is to be able to capture information in the presence of multiple triggering events. Still another technical advantage is to guarantee storage blocks for recording data prior to and subsequent to last triggering event in response to the occurrence of an unknown number of triggering events. Other technical advantages may be readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
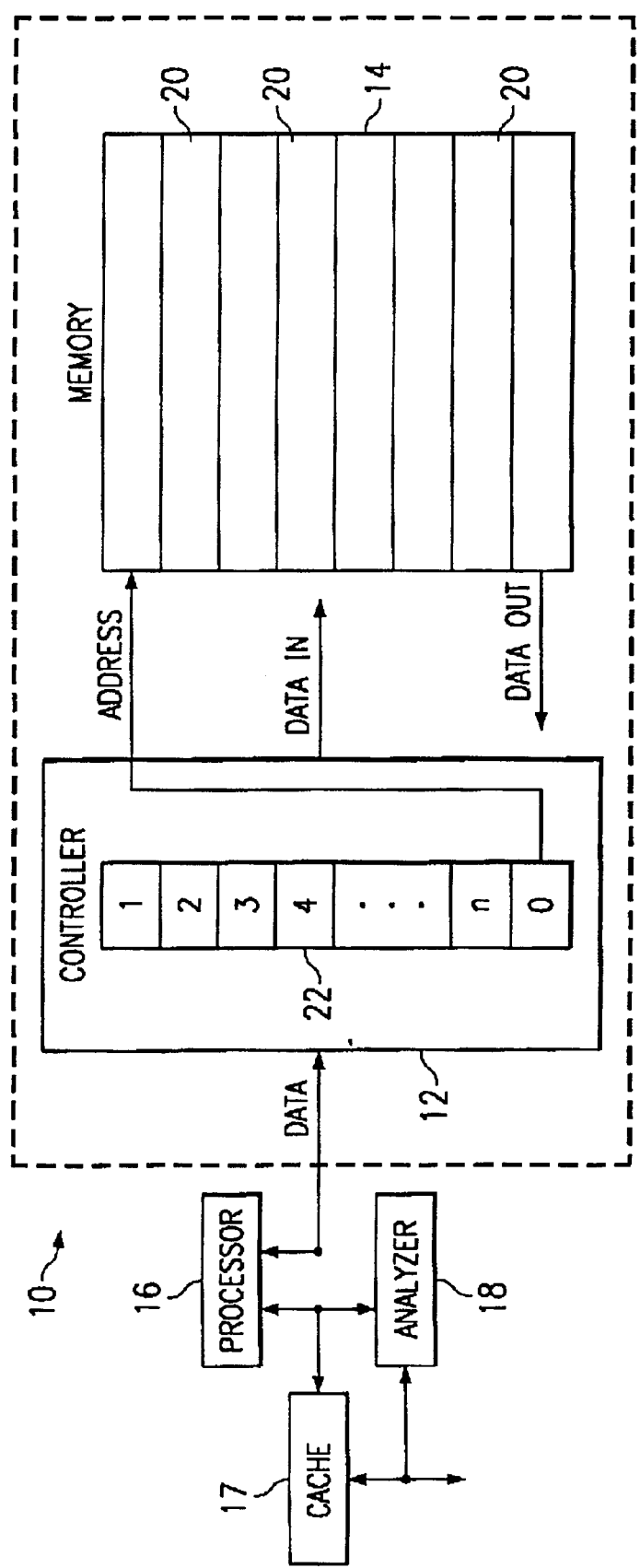
FIG. 1 illustrates a simplified block diagram of a device for capturing information.

FIG. 1 is a simplified block diagram of an information capturing device 10. Device 10 includes a controller 12 and a memory 14. Information passed between a processor 16 and a cache 17 may be provided by processor 16 to controller 12 and stored in memory 14. Processor 16 may provide this information stored in memory 14 to an analyzer 18 for appropriate troubleshooting of failures in operation of processor 16. External analyzer 18 may also receive cache information generated from or provided to cache 17 for appropriate debugging. An example implementation for device 10 is as a trace recorder for the capturing of internal signals of a central processing unit in a microprocessor based integrated circuit. A more detailed explanation of the trace recorder implementation can be found in copending U.S. application Ser. No. 09/788,174 entitled "Method and Apparatus for Recording Trace Data in a Microprocessor Based Integrated Circuit" which is hereby incorporated by reference herein. Controller 12, memory 14, processor 16, cache 17, and analyzer 18 may be implemented as separate independent elements or two or more may be combined into a single unit or integrated circuit.

Controller 12 partitions a memory space of memory 14 into a plurality of memory blocks 20. Each memory block stores information received through controller 12 from processor 16. The information received from processor 16 may include, among other things, items such as data, instruction code, processor state, and internal cache state. Each memory block 20 may encompass a single entry or a group of entries into memory 14. For example, a memory 14 with a 512 entry capacity may have 512 separate memory blocks 20 or 8 memory blocks 20 each with 64 individual entries of their own or larger groups of entries. Memory 14 may also be partitioned into individual sectors having memory blocks 20 with individual or groups of entries. Memory 14 may be partitioned into any number of memory blocks 20 as desired with similar or different sizes. Controller 12 includes an order map register 22 to determine the order of information capture into memory 14.

Figure 2:
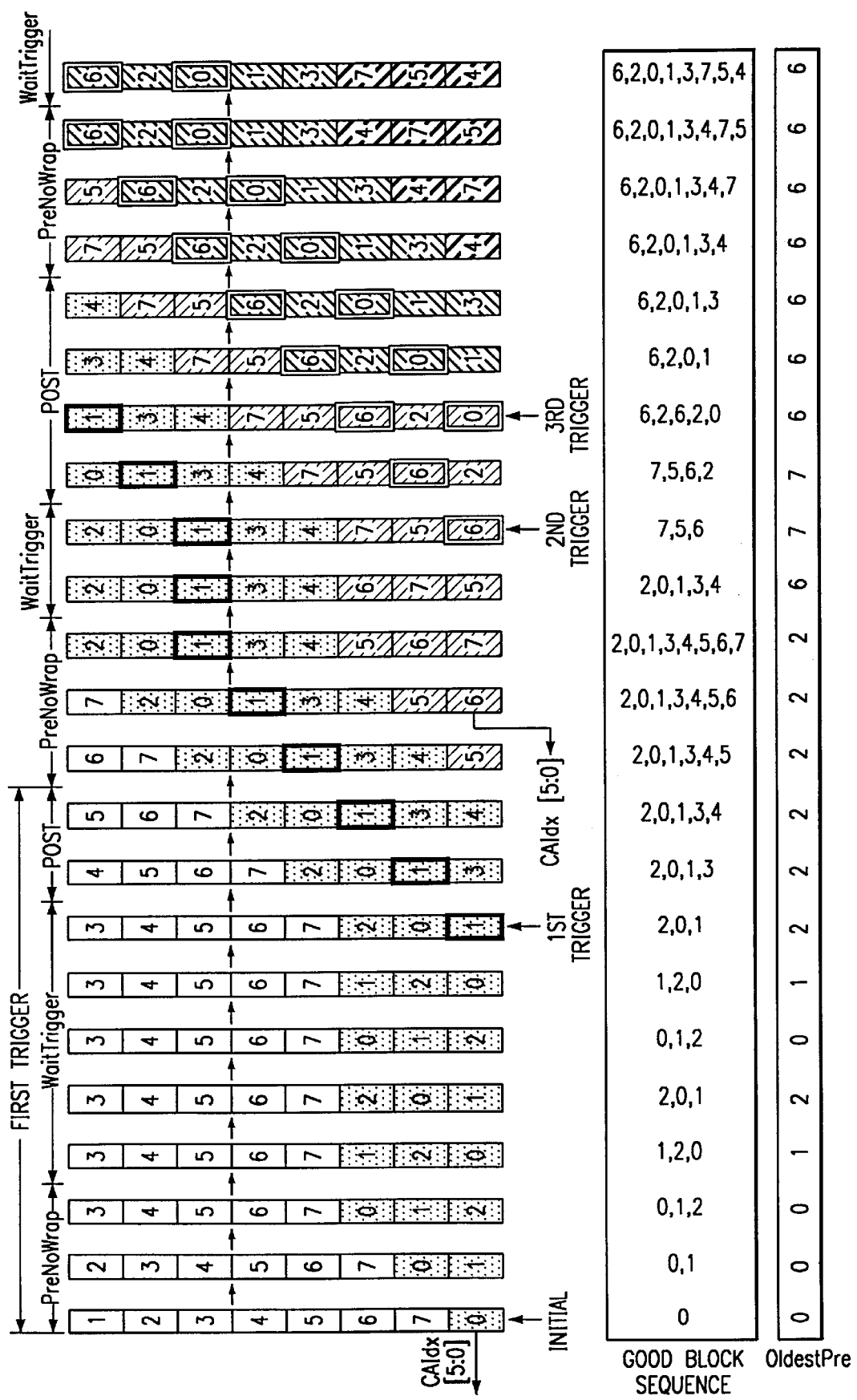
FIG. 2 illustrates an example of how information is captured by the device.

FIG. 2 shows how information is captured in memory 14. An example of an eight memory block partition for memory 14 is shown though other partitioning schemes may also be implemented. The technique for capturing information ensures that current pre- and post-trigger information is captured and maintained as well as the capture of subsequent pre-trigger information in case there is more than one triggering event. Since it is not known whether the current trigger is the last trigger, subsequent pre-trigger information is captured in order to handle a subsequent triggering event. A first set of memory blocks 20 is used to capture the current pre-trigger information. A second set of memory blocks 20 is used to capture current post-trigger information. A third set of memory blocks 20 is used to capture the subsequent pre-trigger information in case a subsequent triggering event occurs. Upon occurrence of a subsequent triggering event, information is captured and maintained as if it was the first triggering event to occur. Memory blocks 20 are reused and recycled in order to handle multiple triggering events. Information capture may also be interleaved within a memory block 20 and among or between different memory blocks 20 through identification of the correct ordering of the captured information. Examples of identifying the correct ordering of captured information within memory 14 include storing the order map associated with a triggering event in memory 14 and including an address to a next entry or block in the current entry or block.

Order map register 22 visits three different states during the capture of data—a PreNoWrap state, a WaitTrigger state, and a Post state. In the PreNoWrap state, information is captured into a first set of memory blocks 20. The number of memory blocks in this first set can be set as desired, even zero, and may be dynamically changed on a per triggering event basis. For the example shown, there are three memory blocks 20 used in the PreNoWrap state, memory blocks 0, 1, and 2. Upon reaching a storage capacity of the first set of memory blocks 20 in the PreNoWrap state, controller 12 and order map register 22 enter the WaitTrigger state. In the WaitTrigger state, the memory blocks 20 in the first set are recycled to continuously capture information while waiting for a triggering event to occur. Previous information is overwritten by newly captured information as memory blocks 20 are reused. Though shown as sequentially capturing information in memory blocks 0, 1, and 2 during the PreNoWrap state and recycling sequentially through memory blocks 0, 1, and 2 in the WaitTrigger state in a wrap around technique, information may be captured into memory blocks 0, 1, and 2 in any desired order. Further, information may be captured similarly or differently in all or a portion of each memory block 0, 1, and 2 and information capture may begin at any point within a respective memory block 20. An identity of the oldest pre-trigger memory block 20 is continuously maintained.

Upon receiving a triggering event, for example as shown to occur while in memory block 1, controller 12 and order map register 22 enter the Post state. In the Post state, information capture ceases to occur in the first set of memory blocks 20. The oldest pre-trigger block is flagged, in this case memory block 2. A second set of memory blocks is used to capture information after the occurrence of a triggering event. The number of memory blocks 20 in this second set can be set as desired, even zero, and may be dynamically changed on a per triggering event basis. For the example shown, there are two memory blocks 20 used in the Post state, memory blocks 3 and 4. Information subsequent to the triggering event is captured in memory blocks 3 and 4. Information subsequent to the triggering event may be captured in any unused portion of memory block 1 before being captured in memory blocks 3 and 4.

Upon reaching the storage capacity of the second set of memory blocks 20, memory blocks 3 and 4 here, controller 12 and order map register 22 enter the PreNoWrap state. A third set of memory blocks 20 are used in this subsequent PreNoWrap state namely memory blocks 5, 6, and 7. Upon reaching the desired storage capacity of this third set of memory blocks 20, controller 12 and order map register 22 enter the WaitTrigger state. The Wait Trigger state operates as identified above with memory blocks 5, 6, and 7 being reused while waiting for another triggering event. Thus, pre- and post-trigger capture information associated with this first triggering event has been maintained in memory blocks 2, 0, 1, 3, and 4 while pre-trigger capture information for a possible second triggering event is continuously being stored in memory blocks 5, 6, and 7. Controller 12 may be set up to provide the information from these memory blocks 20 upon the occurrence of a first triggering event.

In most cases, multiple triggering events will occur and it becomes necessary to capture information associated with the most recent triggering event. Upon receiving another triggering event, in this case during memory block 6, controller 12 and order map register 22 enter the Post state. In the Post state, information capture ceases in the third set of memory blocks 20. The oldest pre-trigger block is flagged, in this case memory block 7. A fourth set of memory blocks 20 is used to capture information after the occurrence of this second triggering event. The fourth set of memory blocks 20 may include individual memory blocks from the first set of memory blocks 20 depending on how the memory space of memory 14 was partitioned. For this example, the memory space of memory 14 was partitioned into 8 memory blocks 20. This results in memory blocks 2 and 0 being a part of the fourth set of memory blocks 20. Thus, pre- and post-trigger capture information associated with this second triggering event has been maintained in memory blocks 7, 5, 6, 2, and 0.

In continuing with the example, normally a fifth set of memory blocks 20 would be used in the PreNoWrap and WaitTrigger states similar to the discussion above but using memory blocks 1, 3, and 4. However, triggering events may occur at any time. As shown, a third triggering event occurred in the fourth set of memory blocks 20, specifically at memory block 0. Controller 12 and order map register 22 remain in the Post state and information capture ceases in the fourth set of memory blocks 20. The oldest pre-trigger block is flagged, in this case memory block 6. A fifth set of memory blocks 20 is used to capture information after the occurrence of the third triggering event. The fifth set of memory blocks 20 includes memory blocks 1 and 3 reused from storage of captured information during the first triggering event. Information subsequent to the third triggering event is captured in memory blocks 1 and 3.

Upon reaching the storage capacity of the fifth set of memory blocks 20, memory blocks 1 and 3 here, controller 12 and order map register 22 enter the PreNoWrap state. A sixth set of memory blocks 20 are used in this subsequent PreNoWrap state namely memory blocks 4, 7, and 5. Upon reaching the desired storage capacity of this sixth set of memory blocks 20, controller 12 and order map register 22 enter the WaitTrigger state. The Wait Trigger state operates as identified above with memory blocks 4, 7, and 5 being reused while waiting for another triggering event. Thus, pre- and post-trigger capture information associated with this third triggering event has been maintained in memory blocks 6, 2, 0, 1, and 3 while pre-trigger capture information for a possible fourth triggering event is continuously being stored in memory blocks 4, 7, and 5.

Thus, it is apparent that there has been provided, in accordance with the present invention, a device and method for storing information in memory that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. A method for storing data in a memory, comprising:

partitioning a memory space into a plurality of memory blocks;

storing received information in a first predefined number of the plurality of memory blocks;

receiving a first triggering event;

ceasing storage of received information in the first predefined number of the plurality of memory blocks in response to the first triggering event;

storing received information in a second predefined number of the plurality of memory blocks in response to the first triggering event, the second predefined number of the plurality of memory blocks being a different portion of the memory space than the first predefined number of the plurality of memory blocks;

providing received information associated with the first triggering event in the first predefined number and the second predefined number of the plurality of memory blocks for analysis of the first triggering event.

2. The method of claim 1, wherein storing received information in the first predefined number of the plurality of memory blocks includes reusing individual memory blocks within the first predefined number of the plurality of memory blocks for storing received information upon reaching the storage capacity of the first predefined number of the plurality of memory blocks.

3. The method of claim 1, further comprising:
storing received information in a third predefined number of the plurality of memory blocks upon reaching a storage capacity of the second predefined number of the plurality of memory blocks.

4. The method of claim 3, wherein storing received information in the third predefined number of the plurality of memory blocks includes reusing individual memory blocks within the third predefined number of the plurality of memory blocks for storing received information upon reaching the storage capacity of the second predefined number of the plurality of memory blocks.

5. The method of claim 1, wherein the first predefined number of the plurality of memory blocks maintains received information prior to the first triggering event.

6. The method of claim 3, further comprising:
receiving a second triggering event;
releasing the first predefined number of the plurality of memory blocks to allow storage of received information therein.

7. The method of claim 6, further comprising:
ceasing storage of received information in the third predefined number of the plurality of memory blocks;
storing information in a fourth predefined number of the plurality of memory blocks in response to the second triggering event.

8. The method of claim 7, wherein an individual memory block of the first predefined number of the plurality of memory blocks is part of the fourth predefined number of the plurality of memory blocks.

9. The method of claim 1, wherein the memory space is partitioned into eight memory blocks.

10. The method of claim 1, wherein a number of memory blocks in the first predefined number and the second predefined number are dynamically selected.

11. A device for storing data, comprising:
a memory providing a memory space;
a controller operable to store received information in the memory, the controller operable to partition the memory space of the memory into a plurality of memory blocks, the controller operable to store received information in a first predefined number of the plurality of memory blocks, the controller operable to cease storage of received information in the first predefined number of the plurality of memory blocks in response to a first triggering event, the controller operable to store received information in a second predefined number of the plurality of memory blocks in response to the first triggering event, the first predefined number of the plurality of memory blocks maintaining information received just prior to the first triggering event, the second predefined number of the plurality of memory blocks maintaining information received just subsequent to the first triggering event; the controller operable to provide received information associated with the first triggering event stored in the first predefined number and the second predefined number of the plurality of memory blocks for analysis of the first triggering event.

12. The device of claim 11, wherein the controller is operable to store received information in a third predefined number of the plurality of memory blocks upon reaching a storage capacity of the second predefined number of the plurality of memory blocks.

13. The device of claim 12, wherein the controller is operable to reuse individual memory blocks within the third predefined number of the plurality of memory blocks upon reaching a storage capacity of the third predefined number of the plurality of memory blocks.

14. The device of claim 13, wherein the controller is operable to cease storing received information in the third predefined number of the plurality of memory blocks in response to a second triggering event, the controller operable to store received information in a fourth predefined number of the plurality of memory blocks in response to the second triggering event, the controller operable to use individual memory blocks from the first predefined number of the plurality of memory blocks for the fourth predefined number of the plurality of memory blocks.

15. The device of claim 11, wherein the controller is operable to reuse individual memory blocks within the first predefined number of the plurality of memory blocks upon reaching a storage capacity of the first predefined number of the plurality of memory blocks when a triggering event has not occurred.

16. A device for storing data, comprising:
a processor;
a cache operable to provide information to and receive information from the processor;
a single memory providing a memory space;
a controller operable to receive information passed between the processor and the cache, the controller operable to partition the memory space of the memory into a plurality of memory blocks, the controller operable to store received information in a first predefined number of the plurality of memory blocks, the controller operable to overwrite stored information in the first predefined number of the plurality of memory blocks with newly received information in absence of a first triggering event, the controller operable to cease storage of received information in the first predefined number of the plurality of memory blocks in response to the first triggering event, the controller operable to store received information in a second predefined number of the plurality of memory blocks in response to the first triggering event, the first predefined number of the plurality of memory blocks maintaining information received just prior to the first triggering event, the second predefined number of the plurality of memory blocks maintaining information received just subsequent to the first triggering event;
an analyzer operable to receive information stored in the memory from the controller for analysis.

17. The device of claim 16, wherein the information provided by the processor includes any of data, instructions, processor status, and cache status.

18. The device of claim 16, wherein the controller partitions the memory space of the memory into eight memory blocks.

19. The device of claim 16, wherein the controller passes the information captured with respect to the first triggering event to the analyzer.

20. The device of claim 16, wherein the processor, the cache, the memory, and the controller are implemented together on an integrated circuit.

* * * * *